(12) United States Patent
Vialle (10) Patent No.: US 7,114,503 B2
(45) Date of Patent: Oct. 3, 2006

(54) PROCESS FOR PRODUCING AN OPEN CELLED FOAM

(75) Inventor: Joseph Engelbert Christiaan Vialle, Venlo (NL)

(73) Assignee: B.V. Produkt Ontwikkeling Beheer, Venlo (NL)

( * ) Notice: Subject to any disclaimer, the term of this patent is extended or adjusted under 35 U.S.C. 154(b) by 36 days.

(21) Appl. No.: 10/435,942

(22) Filed: May 12, 2003

(65) Prior Publication Data

US 2003/0225175 A1     Dec. 4, 2003

Related U.S. Application Data

(63) Continuation of application No. PCT/NL01/00846, filed on Nov. 21, 2001.

(30) Foreign Application Priority Data

Nov. 21, 2000   (NL) .................................... 1016665

(51) Int. Cl.
*A24D 3/02* (2006.01)
*A24D 3/04* (2006.01)

(52) U.S. Cl. ..................... 131/200; 131/203; 131/202; 131/216; 521/82; 521/85; 521/106; 521/178

(58) Field of Classification Search .................. 521/78, 521/79, 82, 85, 106, 178; 131/200, 202, 131/203, 216
See application file for complete search history.

(56) References Cited

U.S. PATENT DOCUMENTS

| | | | |
|---|---|---|---|
| 2,860,856 A | | 11/1958 | Bauer |
| 3,861,404 A | | 1/1975 | Changani |
| 3,939,849 A | * | 2/1976 | Baxter et al. ................ 131/332 |
| 4,060,572 A | | 11/1977 | Widmann |
| 4,232,130 A | * | 11/1980 | Baxter et al. ................ 521/143 |
| 4,282,890 A | | 8/1981 | Howell, Jr. et al. |

FOREIGN PATENT DOCUMENTS

| | | |
|---|---|---|
| DE | 27 45 268 | 4/1979 |
| EP | 0 096 676 A2 | 6/1983 |
| FR | 79 22363 | 3/1981 |
| GB | 755075 | 8/1956 |
| NE | 184057 | 4/1989 |

OTHER PUBLICATIONS

Basopor®—BasomoL®, *Technishes Merkblatt*, BASF, Jun. 1996.
English Abstract of Italian patent 574,416 from *18-Inorganic Industrial Chemicals*, col. 2030, 1961.
Sonderdruck aus Becker/Braun, *Kunststoff-Handbuch*, Band 10: Duroplaste, © Carll Hanser Verlag Müchen Wien 1988, pp. 754-760, Chapter 9.4: "Aminoplast-Schaumstoffe" by Prof. H. Baumann.
"Isolicrung von Schiffen mit spritzbarem Schaumkunstsoff", by Obering. H. Baumann, Frankenthal/Pfalz, *Sonderdruck laut Originalmanuskript* aus der Fachzeitschrift, Hansa, Zentralorgan für Schiffahrt—Schiffbau—Hafen, Heft I, 1959, 4 pages.
www.patents.ibm.com/details/pn Abstract relating to US3861404 (2 pages), 1999.
"Herstellung und Verarbeitung von UF-Schaumkunststoffen—Neue wissenschaftliche und technische Erkenntnisse", by Heinz Baumann, Frankenthal, *Sonderdruck aus Plastverarbeiter*, Heft 5, 1976, 10 pages.
"Plastoponik—ein neues Kulturverfahren für aride Gebiete", by Obering. Heinz Bauman, Frankenthal/Pfalz, *Sonderdruck aus Kunstsoff-Rundschau*, 9 (1962) Heft 4, pp. 169-175 (2 sheets).
*Handbook of polymric foams and foam technologyl* ed. by Daniel Klempner and Kurt C. Frisch—Munich; Vienna; New York; Barcelona: Hanser, 1991, p. 308.
"Water and soil pollution"—*EcoSol—The Solution*, from Vialle Minerals BV, Venlo, The Netherlands, 1996-2003, 5 pages.
*Handbook of polymric foams and foam technologyl* ed. by Daniel Klempner and Kurt C. Frisch—Munich; Vienna; New York; Barcelona: Hanser, 1991, pp. 22-23, 34-35 and 310-311.
"Basopor Basomol," *Technisches Merkblatt*, BASF Aktiengesellschaft, Jul. 2000.
Klempner, D., et al., ed., *Handboof of Polymeric foams and Foam Technology*, pp. 294, 295,, 298, 308, 1991.
Water- and Soil Pollution, *EcoSol The Solution*, 8 pages, 1996.
Rulkens, W., et al., *Verwijdering van Teer en Pak's uit Sigarettenrook met Behulp van eeen Nieuw Ontwikkeld Filter van Netwerkpolymeer*, Wageningen University, 1999, pp. 1-3, 12-16, 21-23 & 34-36.
Benning, C., "vol. 1: Chemistry and Physics of Form Formation," *Plastic Foams: physics and chemistry of product performance and process technology*, 1985, pp. 450-461.
Frisch, K., et al., ed., *Plastic Foams*, 1973, pp. 676-685.
Meyer, B., *Urea-Formaldehyde Resins*, 1979, pp. 192-195.
Gunther, P., *Untersuchungen zur Chemie und Morphologie Von Harnstoff-Formaldehyde-Harz-Schaumen*, 1984, pp. 44, 45 & 84-91.
Smith, J., et al., Fysiche transportverschijnselen. 1991, Voorwoord & b. zwerm deeltjes (2 pages).

* cited by examiner

*Primary Examiner*—Irina S. Zemel
(74) *Attorney, Agent, or Firm*—Ladas and Parry LLP (57) ABSTRACT

The invention relates to a foam for purifying and filtrating air, particularly filtrating toxic compounds, such as for instance tar and polycyclic aromatic hydrocarbons (PAHs) from tobacco smoke, and to a method to prepare this foam. The foam according to the invention is a foam comprising cavities and interstitial spaces situated outside of the cavities, the cavities being defined by walls, the walls of the cavities being composed of a crosslinked polymer and possible additives, the average largest dimension of the cavities being in the range of 30–350 µm, a considerable part of the cavities comprising two or more perforations in their walls, the perforations having an average diameter in the range of 5–300 µm, a considerable part of the perforations of adjacent cavities being positioned with respect to each other such that a continuous, non-linear path is formed, the foam having a porosity of at least 45 vol. % the porosity being defined as the volume percentage, based on the total volume of the foam, of that part of the foam accessible to matter passing through the foam, and the foam having a specific surface in the range of 0.1–15 m²/g.

26 Claims, 8 Drawing Sheets

PROCESS FOR PRODUCING AN OPEN CELLED FOAM

This application is a continuation of an international application PCT/NL01/00846 filed on Nov. 21, 2001.

FIELD OF THE INVENTION

The invention relates to a foam for purifying and filtrating air, particularly filtrating toxic compounds, such as for instance tar and polycyclic aromatic hydrocarbons (PAHs) from tobacco smoke, and to a method to prepare this foam.

BACKGROUND OF THE INVENTION

The most important filter material used worldwide for purifying and filtrating tobacco smoke, is cellulose acetate that may or may not be used in combination with activated carbon.

The usual filter materials, such as cellulose acetate and activated carbon, have the drawback of not removing a considerable part of the toxic compounds, such as tar and PAHs, present in tobacco smoke.

Furthermore a cigarette filter is described in British patent specification GB 755.057, which filter is formed from a urea formaldehyde foam having a fine foam structure containing cavities that are connected to each other so that tobacco smoke can flow through them, a filtration effect arising with respect to tar and nicotine present in the smoke.

The foam from GB 755.057 is prepared by first foaming a foamable liquid by injecting air into it or by stirring it. Subsequently the foamed liquid is transformed into a durable foam by admixing urea formaldehyde and a suitable catalyst with the liquid. After that the prepared foam is treated with an excess of an aqueous urea solution, in order to thus remove the smell of formalin.

Subsequently the foam treated with the urea solution is subjected to a compression process in order to increase the mechanical stability of the foam and at the same time to ensure that at least some of the hollow spaces remain intercommunicating. In this way, according to GB 755.057, a foam material having a skeleton-like fine structure and intricate shape is produced, comprising a plurality of flow ducts, a relatively low flow resistance and a substantially improved mechanical stability. Said fine structure filtrates the aerosol particles that are carried along by the smoke.

A drawback of the method of preparation according to GB 755.057 is that in the first step, that is to say the foaming of a foamable liquid, mixing takes place under ill-controllable conditions. As a result it is not possible to form a foam of a well-defined structure under well-controlled conditions.

Indeed the structure of the foam is of importance to the filtration effect with regard to tar and nicotine from tobacco smoke. It appeared to applicant that the structure of the foam prepared with the method according to GB 755.057 is not sufficiently effective to filtrate tar and nicotine from tobacco smoke. For instance the aforementioned structure does indeed comprise cavities, however including closed cavities which are not accessible to the aerosol particles carried along by the smoke.

Another drawback of the method of preparation according to GB 755.057 is that after preparation of the urea formaldehyde-based foam, said foam has yet to be subjected to a compression process in order to obtain a well-filtrating foam for a cigarette filter, by breaking the walls of the cavities.

Furthermore, in the Italian patent specification IT 574.416 a method for preparing a urea resin filter mass for the removal of nicotine and tar and other products from tobacco smoke is described. In said method a mixture of a urea formaldehyde solution, a foaming agent, an acid and finely powdered $SiO_2$ gel is stirred until a thick foam forms, which is then allowed to solidify and is dried. $SiO_2$ gel is a strong nicotine-bonding agent.

A drawback of the method according to IT 574.416 is that a $SiO_2$ gel has to be used to obtain a sufficient filtration effect for the final foam product. Another drawback is that mixing takes place under ill-controllable conditions so that, just like in the method of preparation according to GB 755.057, it is not possible to form a foam of well-defined structure.

SUMMARY OF THE INVENTION

It is an object of the invention to provide a foam for purifying and filtrating air, particularly filtrating toxic compounds, such as for instance tar and PAHs, from tobacco smoke, the foam having such a structure that the pollutions are filtrated from the air to a considerable degree.

Surprisingly the above-mentioned object is achieved with a foam comprising cavities and interstitial spaces situated outside of the cavities, the cavities being defined by walls, the walls of the cavities being composed of a crosslinked polymer and possible additives, the average largest dimension of the cavities being in the range of 30–350 µm, a considerable part of the cavities comprising two or more perforations in their walls, the perforations having an average diameter in the range of 5–300 µm, a considerable part of the perforations of adjacent cavities being positioned with respect to each other such that a continuous, non-linear path is formed, the foam having a porosity of at least 45 vol. % the porosity being defined as the volume percentage, based on the total volume of the foam, of that part of the foam accessible to matter passing through the foam, and the foam having a specific surface in the range of 0.1–15 $m^2/g$.

The foam according to the invention has the advantage of having such a structure that the toxic compounds from tobacco smoke can be filtrated to a high degree. The advantageous use of the foam as filter material for cigarettes is further elucidated below.

SHORT DESCRIPTION OF THE FIGURES

The invention will now be described on the basis of the attached figures in which:

FIG. 7 shows two different cross-sections of an injection device used in the preparation of the foam according to the invention, in which

Three-dimensional colour recordings, corresponding to FIGS. 1–5, and 3D-spectacles are open for inspection at the office with which the present application has been filed.

DETAILED DESCRIPTION OF THE INVENTION

Figure 1:
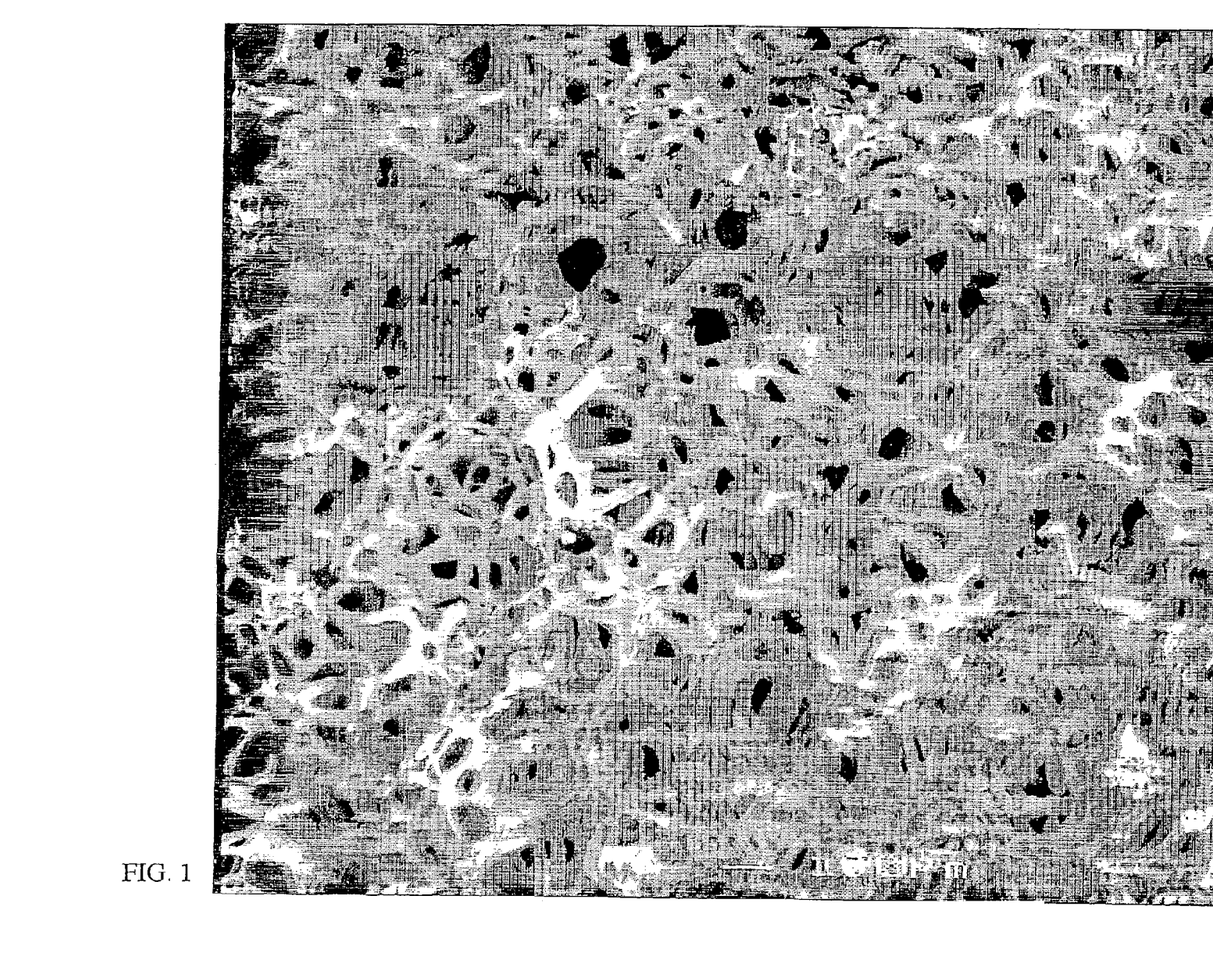
FIG. 1 is a scanning electron-microscopic (SEM) recording of the foam according to the invention (magnification 90×)

Referring to FIG. 1 the structure of the foam according to the invention is described. FIG. 1 regards a SEM recording with which the structure is shown in a three-dimensional manner.

The structure of the foam according to the invention on the one hand comprises cavities, surrounded by walls, and on the other hand spaces situated outside of the cavities, so-called interstitial spaces.

In the art of foaming the aforementioned cavities are also referred to as 'bubbles', 'cells', 'spheres' and the like. The cavities of the foam according to the invention often do not have the ideal shape of a sphere. They may for instance also have an ellipsoidal, spheroidal or another thermodynamically advantageous shape.

The walls of the cavities are composed of a crosslinked polymer and possible additives. In the art a crosslinked polymer is also referred to as 'network polymer'. Preferably the crosslinked polymer is a synthetic organic copolymer, such as for instance a urea formaldehyde-based copolymer. The crosslinked polymer may however also for instance be a polyurethane.

A considerable part, preferably more than 90%, of the walls of the cavities of the foam according to the invention comprise two or more perforations. In the art such perforated cavities are also referred to as 'open cells', 'open spheres', 'pores' and the like. Furthermore cavities that do not comprise any perforation are referred to as 'closed cells', 'closed spheres' and the like. The percentage of closed cavities in the foam according to the invention is relatively low, preferably lower than 10%. Most preferably the foam comprises open cavities only. Furthermore, the foam also comprises a low percentage of cavities which only comprise one perforation, such cavities limiting the flow of tobacco smoke through a filter comprising the foam.

The average largest dimension of the cavities in the foam according to the invention is in the range of 30–350 µm, preferably 50–250 µm. By 'largest dimension' is here meant the longest wall-to-wall distance within a cavity.

The average diameter of the perforations in the walls of the cavities in the foam according to the invention is in the range of 5–300 µm, preferably 5–200 µm, more preferably 10–200 µm and most preferably 10–100 µm. A considerable part, preferably more than 40% and particularly more than 80%, of the perforations of adjacent cavities are positioned with respect to each other or connected to each other such that a continuous, non-linear path is formed. By 'continuous path' is meant that tobacco smoke can flow through a filter, comprising the foam according to the invention, from the beginning to the end of the filter. By 'non-linear path' is meant that aforementioned flow path is not a straight duct but a winding path.

Without being limited by any theory, it is expected that an aerosol particle present in tobacco smoke, such as for instance a tar containing aerosol particle, traversing a continuous, non-linear path, as defined above, can, after traversing a first cavity, be slowed down by colliding against the wall of a next cavity. Tobacco smoke, that leaves the mouthpiece of a cigarette in the direction of the bronchial tubes, may contain $10^9$–$10^{10}$ tar containing aerosol particles per ml, varying in diameter from 0.1 to 1.0 µm (Baker, 1999). As a result the aerosol particle is able to adhere to the wall in the next cavity. Because of this the aerosol particle is incorporated in the cavity. It is not ruled out, however, that aerosol particles can also be incorporated in the interstitial spaces.

As indicator in the quantitative sense for the filtration effect with regard to aerosol particles present in tobacco smoke of a foam, such as the foam according to the invention, the permeability of the foam can be used. Said permeability is determined by the filtration coefficient K.

The filtration coefficient K according to the Kozeny-Carman relation depends on the following three parameters:

$$K = f(1/k,\ \epsilon^3/(1-\epsilon)^2,\ 1/(A_{sp})^2)$$

in which k represents a measure of the winding of the flow path (or labyrinth factor), $\epsilon$ represents the porosity and $A_{sp}$ represents the specific surface.

As appears from the Kozeny-Carman relation shown above, the filtrating effect is predominantly determined by the porosity and the specific surface.

The porosity of a foam is defined here as the volume percentage, based on the total volume of the foam, of that part of the foam accessible to matter passing through the foam. In a system solely consisting of closed spheres, the porosity solely regards the interstitial spaces situated outside of the spheres. On the other hand in a system solely consisting of open spheres, the porosity regards both the interstitial spaces situated outside of the spheres and the spaces within the spheres themselves.

The porosity, as defined above, can be measured by saturating a foam with for instance an organic solvent such as hexanol. It is subsequently determined how large the weight and volume of the solvent incorporated in the foam are. The percentual ratio of said determined volume with regard to the total volume of the foam, represents the porosity as defined above.

The porosity of the foam according to the invention, as defined above and as determined in the manner described above, is at least 45 vol. %. A porosity in the range of 45–99 vol. % is preferred. More preferably the porosity is at least 60 vol. % or in the range of 80–99 vol. %.

The specific surface of the foam according to the invention is 0.1–15 m²/g. Preferably the specific surface is in the range of 3–15 m²/g. The specific surface has been determined by means of nitrogen gas adsorption at –196° C. according to the well known BET-method developed by Brunauer, Emmett and Teller.

The above-mentioned quantitative parameters are no parameters by means of which the filtrating effect with regard to aerosol particles present in tobacco smoke of the foam according to the invention can be predicted with absolute certainty. All properties of the foam, both those that can only be expressed in qualitative sense and those that can also be expressed by quantitative parameters, contribute to said filtrating effect. The actual filtrating effect of the foam according to the invention has been determined by carrying out smoking experiments (see test examples).

Below other properties of the foam according to the invention are discussed.

The structure of the foam according to the invention is characterized in that it lacks orientation in it. That means that the distribution of the size of the cavities over the entire structure is the same. Said distribution is a random distribution. This means that there is no regularity in the distribution of the size of the cavities. For instance the cavities do not all have one and the same value for the largest dimension, as defined above. On the contrary, said largest dimension varies from 30 to 350 μm. Therefore an 'average' largest dimension is meant here.

What was discussed above regarding the distribution of the largest dimension of the cavities, also holds good for the distribution over the entire structure of the diameter of the perforations present in the wall of the cavities. Accordingly an 'average' diameter is meant here.

The shape of the aforementioned perforations may in general be characterized by the length/width ratio. The shape of the perforations in the cavities of the foam according to the invention may vary from circular (isodiametric) to angular. Furthermore the length/width ratio of said perforations can be such that there can be question of a 'burst-like' shape of the perforations.

The specific mass of the foam according to the invention in dry condition can be in the range of 5–100 kg/m$^3$. A specific mass in the range of 5–60 or 10–30 kg/m$^3$ is preferred. More preferably the specific mass is in the range of 10–50 kg/m$^3$.

The structure of the foam according to the invention is also determined by the method of its preparation, particularly the method of mixing when foaming a foaming agent. In said method of mixing, in which air is mixed with the foaming agent, a plurality of inert mixing bodies having a certain dimension are used. Glass, spherical mixing bodies, such as for instance glass beads, can be used as inert mixing bodies.

Figure 4:
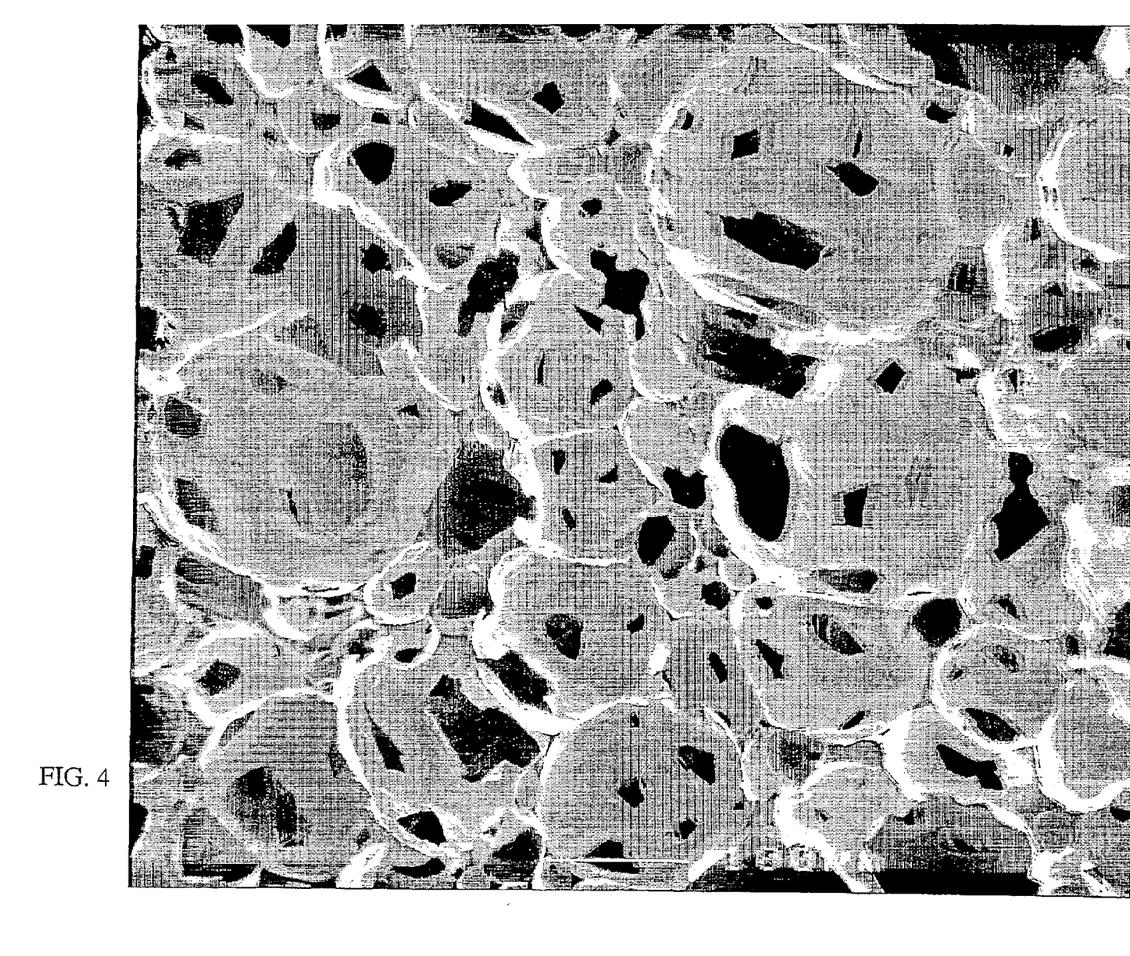
FIG. 4 is a SEM recording of a certain embodiment of the foam according to the invention (magnification 240×)

When using relatively small beads, according to the invention a foam is formed of which a SEM recording is shown in FIG. 4 (bead diameter=4 mm). From FIG. 4 it appears that the proportion of the perforations in the surface of the walls of the cavities is relatively small.

Figure 5:
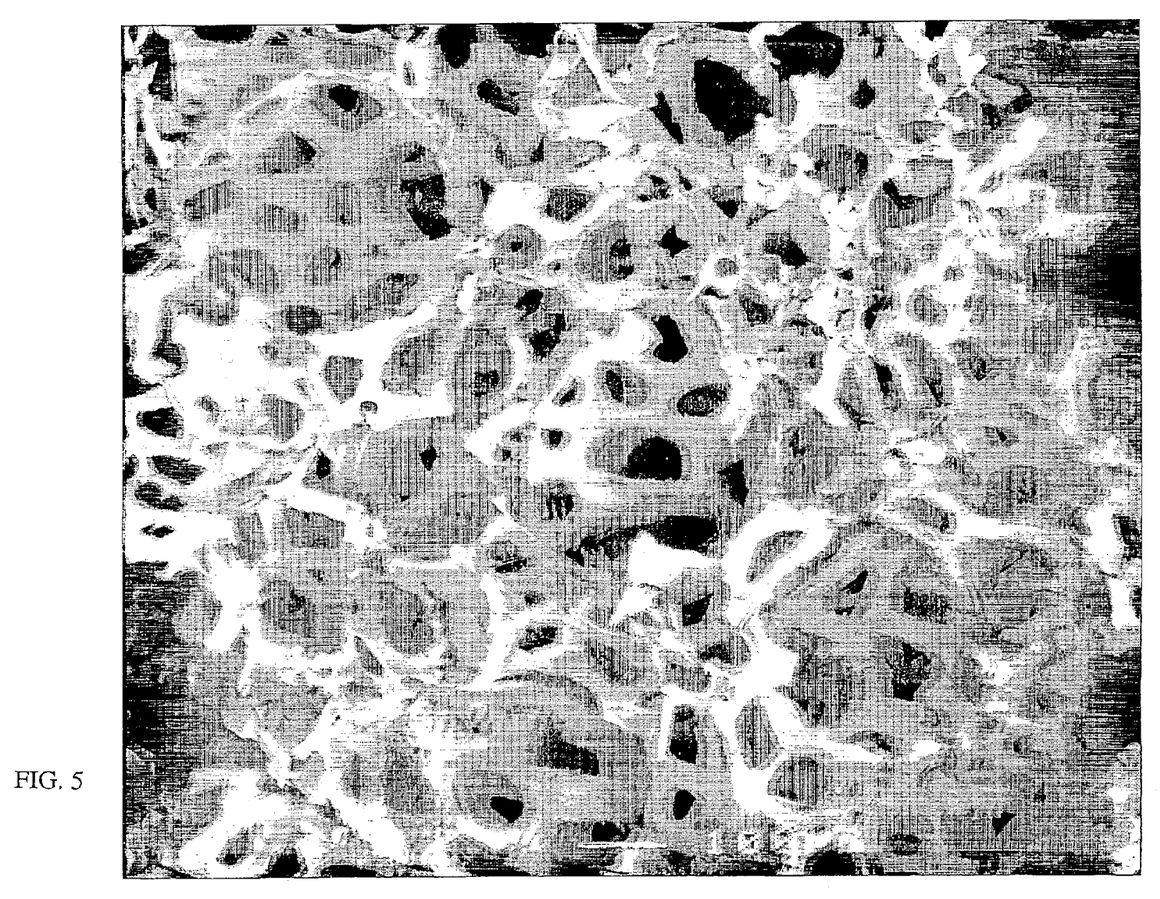
FIG. 5 is a SEM recording of another embodiment of the foam according to the invention (magnification 160×)

When using relatively large beads, according to the invention a foam is formed of which a SEM recording is shown in FIG. 5 (bead diameter=10 mm). From FIG. 5 it appears that the proportion of the perforations in the surface of the walls of the cavities is relatively large.

It appeared to applicant that when using beads having a relatively very large diameter, for instance larger than 15 mm, the cavities are perforated to such a strong degree that a very thin foam is formed. A thin foam is a foam of which the walls of the cavities are not self-carrying. The mechanical stability of such a thin foam is relatively low. Additionally the specific surface decreases. The porosity remains almost the same. When using beads of a relatively very small diameter, for instance smaller than 2 mm, the opposite effect occurs, on the understanding that also the porosity remains almost the same.

In the following a method is described that can be used for the preparation of the foam according to the invention.

Figure 6:
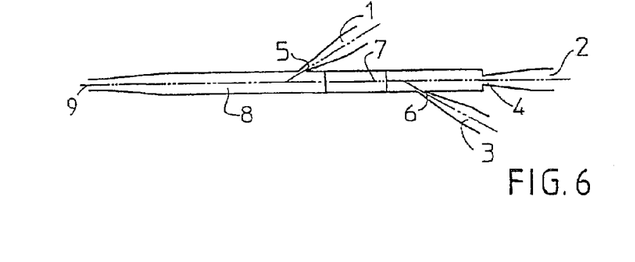
FIG. 6 is a schematic view of an injection device that can be used in the preparation of the foam according to the invention.

In the aforementioned method an injection device is used that is schematically shown in FIG. 6. In the art such an injection device is also referred to a jet pipe.

To a mixing part 7 of the aforementioned injection device under a certain pressure via an inlet 2 and a venturi 4, air is supplied and via an inlet 3 and a venturi 6, a foaming agent solution is supplied. The mixing part 7 is filled with a plurality of inert mixing bodies having dimensions in the range of 2 to 15 mm (not shown in FIG. 6). As mentioned above, glass, spherical mixing bodies, such as for instance glass beads, can be used as inert mixing bodies. Preferably glass beads having a diameter in the range of 4 to 10 mm are used.

In the mixing part 7 the foaming agent solution is foamed so that a non-cured foam is formed. This foam is led to a reaction part 8. Simultaneously a prepolymer solution is supplied under a certain pressure to the reaction part 8 via an inlet 1 and a venturi 5. A crosslinking or polymerization catalyst, such as for instance an acid catalyst, may be supplied, preferably together with the foaming agent solution to the mixing part 7.

As 'prepolymer' for instance a urea formaldehyde precondensate or for instance polyurethane forming reagents can be used. When a solution of a urea formaldehyde precondensate is used, an additional amount of urea is preferably incorporated in this solution (also see GB 755.057 discussed above). By varying the amount of additional urea, the density and brittleness of the foam can be adjusted.

It is preferred to supply the foaming agent solution and the prepolymer solution to the injection device at an equal throughput speed (debit), resulting in a volume ratio between both solutions of 1:1. The aforementioned solutions may optionally comprise additives, such as additives to improve the foaming properties of the foaming agent solution and/or improve the adsorption properties of the foam with regard to substances molecularly present in the gas phase, such as for instance surfactants. Other possible additives to for instance improve the adsorption properties are fillers and pigments, such as for instance silica gel, titanium oxide, activated carbon and the like.

In the reaction part 8 a copolymerization reaction takes place by which a crosslinked polymer or network polymer is being formed. The non-cured foam is converted into a curable foam by this reaction. The specific structure of the foam as formed in the mixing part 7 and the reaction part 8 is then fixated.

The curable foam formed in the reaction part 8 finally leaves the injection device via an outlet 9, at which moment the curable foam in the meantime may have been partially cured. Subsequently this foam is dried to the air and possibly after-heated at a temperature of approximately 40° C., so that a completely cured foam is formed and small polyformaldehyde residues that may still be present are removed.

The foam according to the invention can be ground into a powder. Preferably such a powder has a particle size in the range of 0.1 to 2 mm.

The powder can be incorporated as filter material in a filter for filtrating or purifying air in order to remove pollutions such as toxic compounds from the air. Instead of the powder also the non-ground foam as such can be incorporated as filter material in the filter.

In addition to the foam or powder according to the invention a filter, as defined above, may also comprise organic polymer fibres, such as for instance cellulose acetate.

Furthermore in a cigarette comprising a mouthpiece and a tobacco column and in which the mouthpiece is filled with a filter material, the foam or the powder according to the invention can be used as filter material, possibly in combination with organic polymer fibres, such as for instance cellulose acetate. Such a cigarette filter is for filtrating tar and nicotine and other toxic compounds like PAHs from tobacco smoke.

EXAMPLES

Example 1

In order to obtain the foam according to the invention liquids A and B were first prepared separately.

Liquid A was prepared by mixing 25 kg of a water-soluble urea formaldehyde precondensate (Basopor® 293 Pulver available from BASF Nederland B.V.), 10 kg of urea and 100 liters of water while stirring for 2 hours at 35° C.

Liquid B was prepared by mixing 5.5 liters of a foaming agent (Basomol® 514 flüssig available from BASF Nederland B.V., which is an aqueous solution comprising 25% by weight of phosphoric acid and less than 10% by weight of resorcinol and having a pH of 1–2), and 100 liters of water while stirring for approximately 30 minutes at 35° C.

Figure 7A:
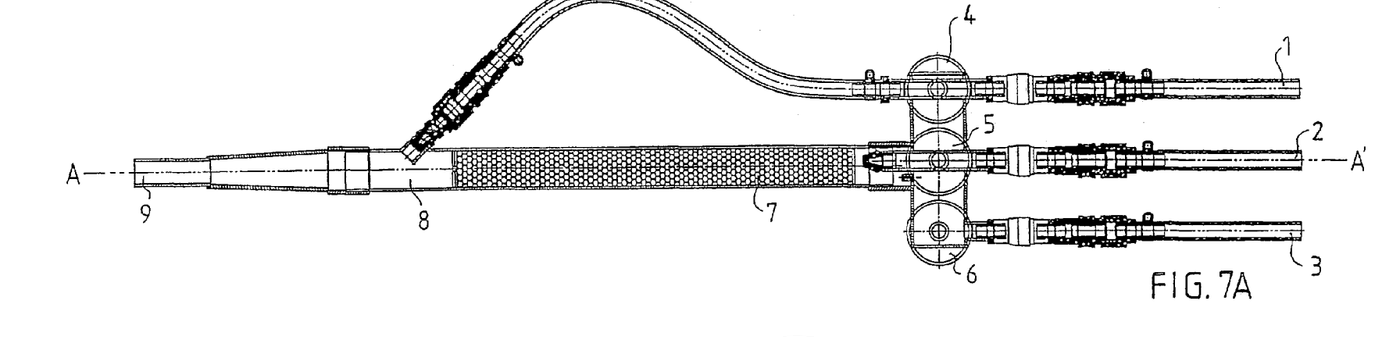
Figure 7B:
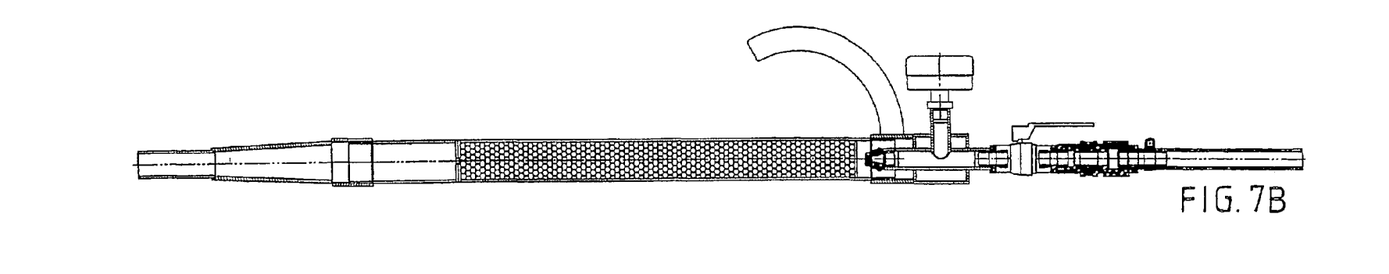
FIG. 7B shows a cross-section that is perpendicular to the line A–A' in FIG. 7A.

In order to prepare the foam according to the invention use was subsequently made of an injection device as shown in FIG. 7, the general operation of which has been discussed above in connection with FIG. 6. The reference numbers mentioned in FIG. 7 have the same meaning as those in FIG. 6. The mixing part 7 from FIG. 7 was filled with glass beads having a diameter of approximately 7 mm.

To the mixing part 7 at a temperature of approximately 35° C., liquid B under a pressure of 11.5 bar and at a throughput speed of 10 liter/minute via the inlet 3 and air under a pressure of 5.5 bar via the inlet 2 were supplied. Because of the mixing a non-cured foam was formed that was subsequently led to the reaction part 8 to which simultaneously via the inlet 1 liquid A was supplied under a pressure of 11.5 bar and at a throughput speed of 10 liter/minute. In the reaction part 8 a quick copolymerization reaction took place at a temperature of approximately 35° C., which reaction was catalyzed by the acid catalyst present in liquid B, so that a curable foam was formed.

The foam that might have been partially cured, was discharged via the outlet 9 under atmospheric pressure, dried to the air and subsequently after-heated at a temperature of approximately 40° C., so that a completely cured, light-coloured foam was formed. Subsequently the cured foam was crumbled into a powder.

A SEM recording was taken both from the powder and from the dried and after-heated foam. The SEM recordings for the powder and the foam showed a similar structure. The SEM recording for the foam is shown in FIG. 1.

Subsequently a number of quantitative parameters for the foam were determined, in which the parameters were defined and determined in the manner described above.

The foam had an average largest dimension of the cavities of approximately 275 µm. The perforations in the walls of the cavities were essentially circular and had an average diameter of approximately 250 µm. Furthermore the foam had a porosity of approximately 65 vol. %, a specific surface of approximately 0.8 $m^2/g$ and a specific mass of approximately 20 $kg/m^3$. The other structure properties of the foam in qualitative sense have already been discussed above.

Example 2

In this example the method as described in example 1 was used, with the exception that in the preparation of liquid A 2 kg of urea were used and that in the preparation of liquid B 115 liters of water were used.

The foam thus obtained had an average largest dimension of the cavities of approximately 275 µm. The perforations in the walls of the cavities were essentially circular and had an average diameter of approximately 100 µm. Furthermore the foam had a porosity of approximately 97 vol. %, a specific surface of approximately 12 $m^2/g$ and a specific mass of approximately 20 $kg/m^3$. The other structure properties of the foam in qualitative sense have already been discussed above.

Example 3

In this example a polyurethane foam was prepared as a foam according to the invention while using the method as described in example 1.

Liquid A was an aqueous solution containing 25 kg of polyethylene glycol (molar mass of about 1000 g/mol), 9 kg of hexamethylene diisocyanate and 0.1 kg of triethylamine as catalyst. Liquid B was an aqueous solution containing 2 kg of 1,4-butanediol, 0.4 kg of 1,2,5-hexanetriol and 0.1 kg of triethylamine as catalyst. Liquids A and B had an equal volume of 100 litres.

Subsequently a number of quantitative parameters for the foam were determined, in which the parameters were defined and determined in the manner described above.

The foam had an average largest dimension of the cavities of approximately 300 µm, in which in addition to a plurality of interstitial spaces having a diameter of between 200 and 275 µm, large interstitial spaces having a diameter of approximately 1000 µm were also present. The perforations in the walls of the cavities essentially had an elongated or 'burst-like' shape having an average length of approximately 80 µm and an average width of approximately 20 µm. Said perforations therefore had an average diameter of 80–20 µm. Furthermore the foam had a porosity of approximately 52 vol. %, a specific surface of approximately 4 $m^2/g$ and a specific mass of approximately 48 $kg/m^3$. The relatively low value of the porosity indicates that this foam contains a considerable number of closed cavities.

Comparative Example 1

In this comparative example a urea formaldehyde foam was prepared using the method described in GB 755.057.

Figure 3:
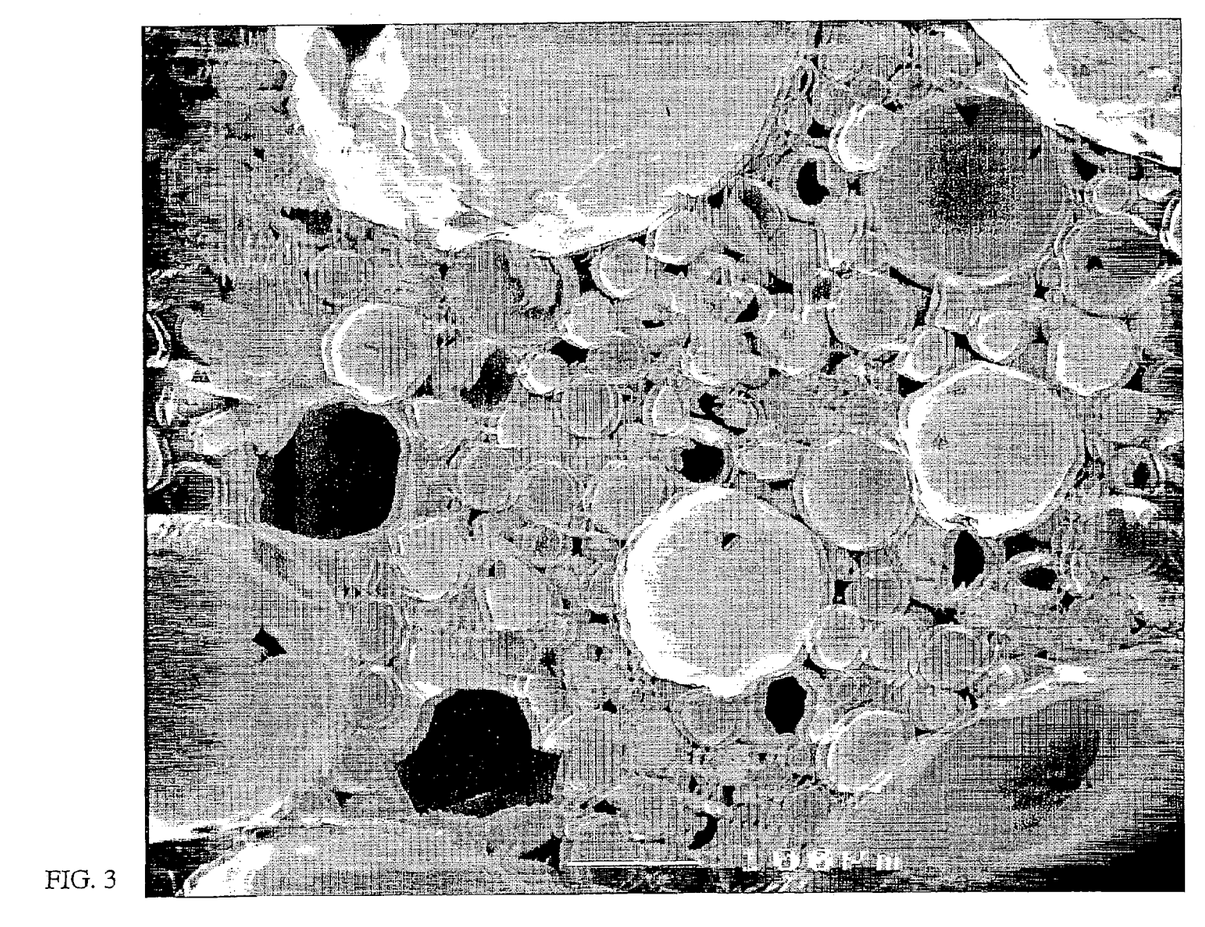
FIG. 3 is a SEM recording of the urea formaldehyde-based foam according to GB 755.057 (magnification 240×)

A SEM recording was made of the foam thus obtained which is shown in FIG. 3.

Subsequently a number of quantitative parameters were determined for the foam, in which the parameters were defined and determined in the manner described above.

The foam had an average largest dimension of the cavities of approximately 35 µm, in which in addition to predominantly spaces having a largest dimension in the range of 30–50 µm, also very large spaces having a largest dimension in the range of 600–700 µm were present. Furthermore the foam had an average perforation diameter of approximately 30 µm, on the understanding that there were very few perforations in the walls of the cavities so that there was no question of a spatial continuum. That means that in the foam prepared in this comparative example none to very few perforations of adjacent cavities are positioned with respect to each other or connected to each other such that a continuous, non-linear path is formed, which with the foam according to the invention is indeed the case. Finally the foam had a porosity of approximately 50 vol. %, a specific surface of approximately 7 $m^2/g$ and a specific mass of approximately 80 $kg/m^3$.

Thus the structure of the foam prepared in this comparative example was considerably different from the structure of the foam according to the invention, like for instance with regard to the degree of the cavities being perforated, which has already been discussed above.

Comparative Example 2

Figure 2:
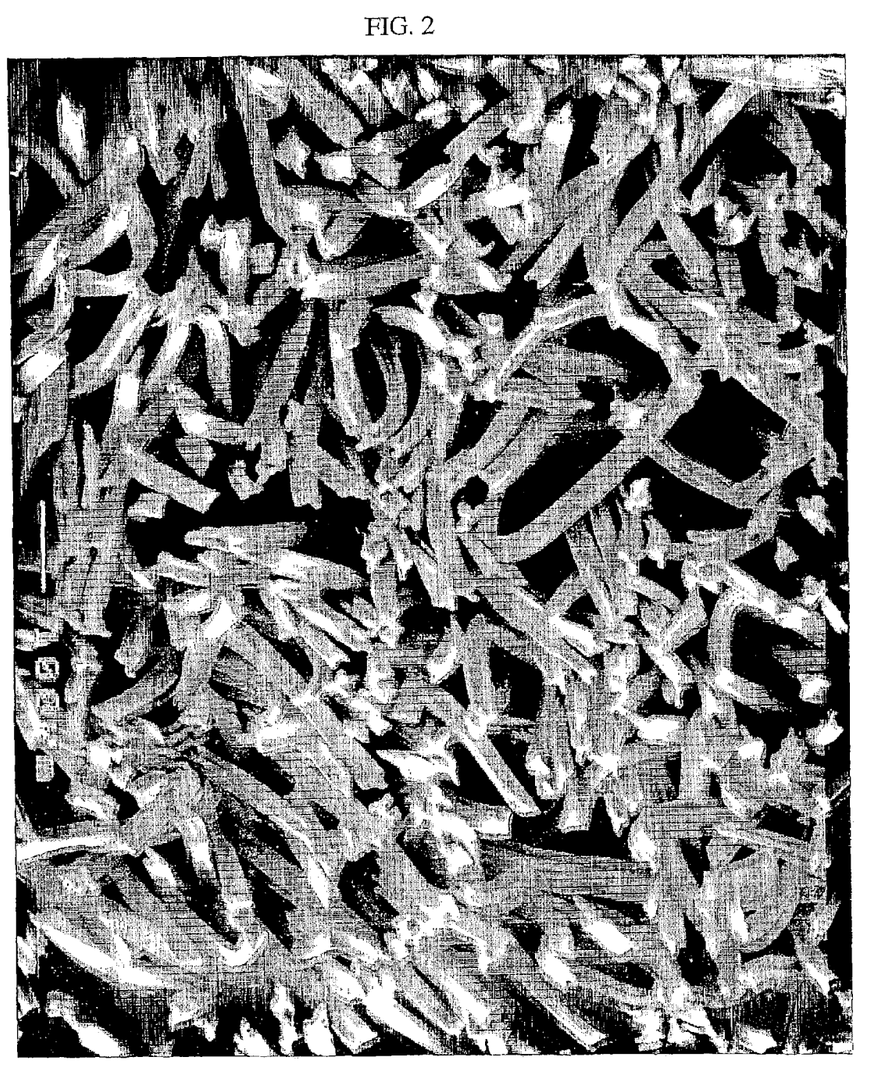
FIG. 2 is a SEM recording of cellulose acetate filter material (magnification 200×)

To compare the structure of the foam according to the invention to the structure of cellulose acetate, which is used as filter material in commercially available cigarette filters, a SEM recording was made of said cellulose acetate which is shown in FIG. 2.

From FIG. 2 it appears that the cellulose acetate from the aforementioned cigarette filters has an irregular fibrous structure which clearly differs from the structure of the foam according to the invention that comprises perforated cavities.

Test Examples

Test Methods

Cigarettes

Experiments with tobacco smoke were carried out with filter cigarettes generally available in retail shops producing 12 mg of tar and 0.9 mg of nicotine, specified on the packaging. The mouthpiece arranged by the manufacturer consisted of a filter of 120 mg of cellulose acetate (below referred to as 'CA') in a paper casing. The CA filter was removed from the paper casing with a pair of tweezers and partially replaced by a powder of the foam according to the invention, such as a powder of the foam prepared in example 1 (below referred to as network polymer filter material or 'NP material') or a powder of the foam prepared in example 3 (below referred to as 'PU material').

To that end the NP or PU material was manually reduced with a grater (boreholes of the grater 1.6–1.8 mm), subsequently dried for 16–20 hours at 40° C. and placed in the original paper casing between the tobacco column and a halved (60 mg) CA filter on the mouthside. The filter cigarettes were provided in the mouthpiece with 15 or 30 mg, respectively, of network polymer or with 15 mg of PU material. Said filters from now on are referred to as NP-15 or NP-30, respectively, or PU-15. Said filter cigarettes were compared to specimens of which the filter part in the mouthpiece (120 mg of CA) were completely left intact. Said filter will from now on be referred to as 'CA'.

Smoking Experiments

Filter cigarettes were experimentally smoked under continuous and discontinuous conditions using the test arrangements described below.

Continuous Smoking

Figure 8:
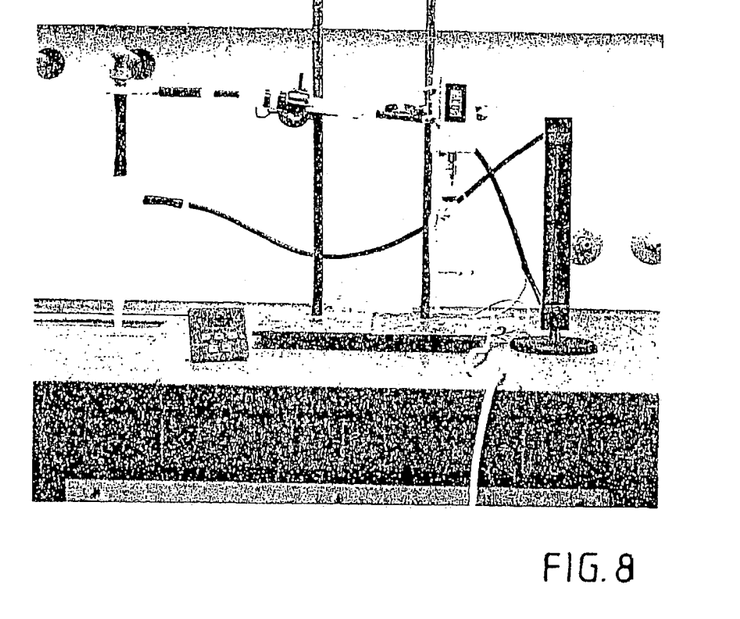
FIG. 8 shows a test arrangement used in a continuous smoking test for testing filters comprising the foam according to the invention or cellulose acetate.

In the research into the effect of continuous smoking, the filter cigarettes were placed in a test arrangement shown in FIG. 8 which consisted of the following parts: water jet pump, flow meter, manometer and absolute filter.

At the suction side, the water jet pump is connected to an artificial mouthpiece in the form of a butyl rubber hose having an internal diameter of 8 mm suitable to the filter cigarettes used.

With the flow meter (Sho Rate model 1355, Brooks Instruments BV, Veenendaal) the air debit was adjusted at 250–330 ml per minute at an average incineration period of 4.0 to 4.5 minutes and a remaining tobacco column of 3–5 mm above the filter. (Some experiments were carried out at 500 ml per minute.)

An absolute filter and a manometer are situated between the mouthpiece and the flow meter. The absolute filter consists of a detachable glass container with 200 mg of NP in it, which as may be expected is amply sufficient to remove all particles from tobacco smoke. It is possible with this absolute filter to determine the quantity of tar that is passed through the cigarette filter, so that the smoker's exposure to tar can be quantified.

Discontinuous Smoking

A standard procedure for the determination of the tar content in discontinuous mechanically smoked cigarettes was originally developed in the nineteen thirties (Bradford, 0.1936). In 1969 said method was adopted as 60/2/35 directive by the US Federal Trade Commission (FTC) and has since been used as legal standard regulation (Pillsbury, 1969). In the present research said FTC method was used. 35 ml of air was sucked in once per minute for 2 seconds.

Figure 9:
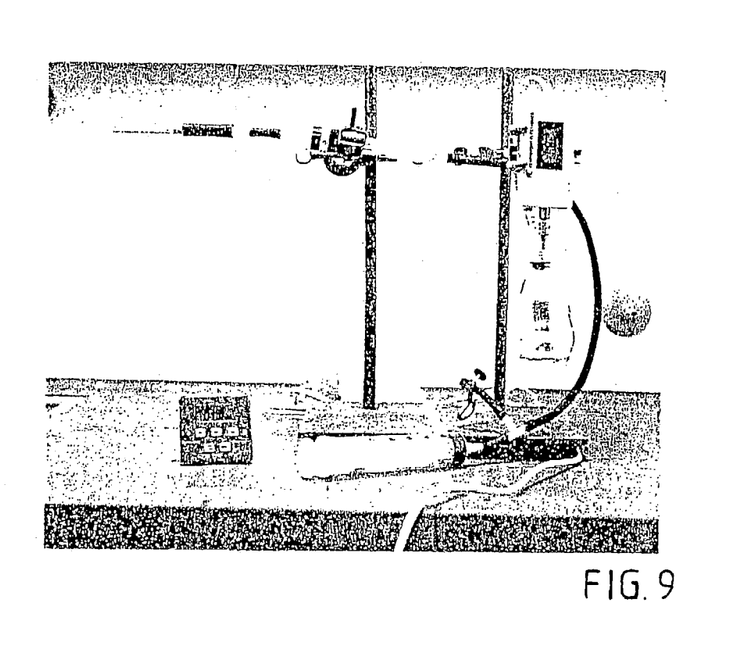
FIG. 9 shows a test arrangement used in a discontinuous smoking test for testing filters comprising the foam according to the invention or cellulose acetate.

The test arrangement used in discontinuous smoking is shown in FIG. 9. In these experiments 6 minutes of incineration period was used, resulting in on average 3–5 mm of remaining tobacco column above the filter. In the experiments use was made of a 50 ml injection syringe with which per cigarette 35 ml of air was sucked in seven times which was discharged by means of a side opening. The butyl rubber mouthpiece used for the cigarette, absolute filter and manometer were the same as in the test arrangement described under 'continuous smoking'.

From the literature (Djordjevic, 1997) it is known that using the FTC method on light-cigarettes is no longer representative for the smoking behaviour. Smoking such cigarettes having a nicotine content lower than 0.9 mg (as mentioned on the packaging) may in practice give rise to a more frequent inhalation behaviour of smokers. The result is that the degree of exposure of the smoker's bronchial tubes to tar becomes higher than shown on the packaging. For that reason it is of importance to gain an understanding of the activity of the NP filter in case of more inhalations per minute.

In the present research, for that reason the tar reduction when smoking according to the standard (60/2/35) FTC directive was compared to the reduction in a double (referred to as 30/2/35 FTC directive) and a quadruple (referred to as 15/2/35 FTC directive) inhalation frequency thereof, respectively.

Determination Pressure Drop Over the Filter

The average pressure drop over the filter cigarettes was measured during both continuous and discontinuous smoking tests, by an electronic manometer (R. S. Components Ltd, Corby, Northans, UK). Use was made here of a 120 ml buffer barrel connected in series with the smoking arrangement without absolute filter. Said barrel was provided with a butyl rubber stopper and an aluminium shrink cap, so that the manometer could be connected via an injection needle.

Determination of Incineration Ash of the Particles in the Smoke After Passing a Cigarette Filter Of the smoke that passed the cigarette filter the particles were filtrated off. Of said particles the incineration ash was determined. This took place with filter cigarettes that were discontinuously smoked in 6 minutes according to the 60/2/35 FTC directive. The determination was carried out for the three filter systems: standard filter of 120 mg of cellulose acetate (CA control), 15 and 30 mg of network polymer plus 60 mg of CA.

In the determination of the incineration ash, use was made of a flat filter (Whatman QM-A cross-section 37 mm) on which the solid phase was collected. The mass increase of the flat filter was determined by weighing, after 16–20 hours of drying at 40° C.

Determination of Tar

Tar from tobacco smoke was extracted with organic solvents from successively cigarette mouth piece, butyl rubber hoses and absolute filter.

The successive extractions of cigarette mouthpiece and absolute filter were carried out with a mixture of 20 ml of ethanol 96%, 20 ml of hexane and 40 ml volume of acetone. The extraction was carried out in screw cap bottles (136 ml) provided with a teflon coated silicone insert cap. The butyl rubber mouthpiece, in which the cigarettes were placed during the experiments, was rinsed with triple 1 ml of acetone in the same screw cap bottle as the absolute filter.

After the screw cap bottles had been placed on a shaking tray (180 strokes a minute, amplitude 5 cm) for 30 minutes, the extracts were filtrated over a paper folded filter (Schleicher & Schüll roodband). The filtrate was collected in a porcelain tray (Ø 10 cm), the filter was subsequently rinsed three times with 20 ml of the same extraction liquid.

After 16–20 hours of evaporation of the extraction liquid at 40° C. and weighing the tar content per cigarette could be determined in which a correction for nicotine (0.9 mg/cigarette) and blank filter were taken into account. It was assumed that nicotine is completely or almost completely removed in the absolute filter.

Determination of PAHs

Polycyclic aromatic hydrocarbons were measured in tobacco smoke that had passed the cigarette filter. The filter cigarettes were smoked in 4.0–4.5 minutes under continuous smoking conditions at an air debit of 500 ml/min.

Three filter systems were examined: standard filter of 120 mg of cellulose acetate (CA control), 15 and 30 mg of network polymer (NP), each time with 60 mg of CA. The sucked in tobacco smoke was consecutively led through a flat filter (Whatman QM-A 37 mm) and a XAD-2 adsorption pattern after passing through said three filter systems.

In this way a separation could be made in the tobacco smoke between PAHs in the solid (particle-bound) phase and the PAHs in the gaseous phase (Chuang et al., 1990).

Flat filter and XAD-2 pattern were extracted with methanol and dichloromethane, respectively. After evaporation under nitrogen the extract was dissolved in 1 ml of acetonitrile. Analysis of this mixture on PAHs was carried out by means of HPLC. Use was made here of a standard mixture having 16 PAHs according to the directive of the Environmental Protection Agency (EPA) for calibration.

Determination of Nicotine

After passing the cigarette filter nicotine was measured in tobacco smoke of filter cigarettes that were smoked discontinuously in 6 minutes according to the 60/2/35 FTC directive.

Three filter systems were examined: standard filter of 120 mg of cellulose acetate (CA control), 15 and 30 mg of network polymer (NP), each time with 60 mg of CA.

Nicotine, bound to particles or molecularly present in the gaseous phase, was concentrated on a flat filter (Whatman GM-A 37 mm) and a XAD-4 adsorption pattern, respectively. In this way a separation could be made in the tobacco smoke between nicotine bound to particles and nicotine molecularly present in the gaseous phase (Chuang et al., 1990). For the analysis of nicotine by means of the gas chromatograph both the flat filter and the XAD-4 adsorption pattern were ultrasonically (35 kHz, 15 minutes) extracted with ethylacetate.

The pH of cigarette smoke was determined by using the continuous smoking arrangement described above equipped with a gas washbottle, but without flow meter, manometer and absolute filter. After absorption of the cigarette smoke of three cigarettes in a gas washbottle of 250 ml filled with 100 ml of demiwater, the pH was directly measured in the liquid. Said pH is defined as pH of cigarette smoke.

Determination of Toxicity of Cigarette Smoke

The general toxicity of the smoke of filter cigarettes after passing the mouthpiece was determined by smoking them discontinuously in 0.6 minutes according to 60/2/35 FTC directive and collecting the smoke. Said general toxicity was determined for three filter systems: standard filter of 120 mg of cellulose acetate (CA control), 15 and 30 mg of network polymer (NP), each time with 60 mg of CA.

In the determination of the general toxicity use was made of a glass container with 200 mg of NP, in which the smoke components were collected after passing the cigarette filter. The content of this filter (200 mg of NP) was extracted with acetone of HPLC quality as described under 'determination of tar'. Said extracts were filtrated over a glasswool filter, evaporated under nitrogen to 2 ml and subsequently stored in screw cap bottles at 4° C.

As measure for the general toxicity, the inhibition of the energy metabolism in cells was determined. This took place with reactivated standard cultures of *Vibrio fischeri*; a bacterium which luminesces in a well-functioning citric acid cycle. The method was carried out in a 96-well plate according to a renovated method (Hamers et al., 2000).

Determination of Toxicity of Incineration Gases of Filter Material

The toxicity of tested filter systems themselves (not exposed to tobacco smoke) was examined in an orientating experiment with complete incineration of filter material, including paper casing.

The standard filter of 120 mg of cellulose acetate (CA control) was compared to 30 mg of network polymer (in this case not in combination with 60 mg of CA). Use was made here of the butyl rubber mouthpiece described under 'continuous smoking' and a water jet pump adjusted at 20 liters of air per minute.

After having been incinerated manually with a lighter, the incineration gases of both filter materials were absorbed in a 250 ml gas washbottle filled with HPLC quality acetone or demineralised water (in both cases 50 ml). Both absorption liquids were filtrated over glasswool and stored in screw cap bottles at 4° C. Serving as blank in the *V. fischeri* assay was the surrounding air heated with a lighter, which air, after passing for 5 minutes (total of 100 liters of air) was absorbed in both liquids.

DR-CALUX Assay

The chemical-activated luciferase expression (CALUX) assay for substances activating the dioxin receptor (DR) is a new type of in vitro bioassay with which the PAH and dioxin specific toxicity of a mixture of compounds can be quickly and sensitively quantified (Murk, 1998). Use is made here of a liver tumor cell line from the rat in which the gene that encodes for luciferase originating from fire flies, has been coupled as reporter to the activation of the dioxin receptor.

The DR-CALUX assay was carried out with smoke originating from filter cigarettes that were discontinuously incinerated in 6 minutes according to the 60/2/35 FTC directive.

Three filter systems were examined: standard filter of 120 mg of cellulose acetate (CA control), 15 and 30 mg of network polymer (NP), each time with 60 mg of CA. The solid phase of tobacco smoke, after passing the cigarette filter, was concentrated in a glass container containing 200 mg of NP. The content of this filter (200 mg of NP) was extracted with acetone of HPLC quality as described under 'determination of tar'.

Said extracts were filtrated over a glasswool filter and subsequently evaporated under nitrogen to 2 ml and stored in screw cap bottles at 4° C.

Depending on the incubation period mainly the decomposable PAH-like compounds or just the stable dioxin-like compounds were quantified. The DR-CALUX assay was carried out in a luminometer with 2,3,7,8-tetrachlorodibenzo-p-dioxin (TCDD) as standard. The CALUX response was converted into nanomol TEQs (TCDD equivalents) per ml of refined extract.

RESULTS

PU Filter

The PU-15 filter worked only 12% better with regard to tar removal than the CA filter in a discontinuous smoking experiment, as described above under 'Test methods'. Below the test results for the NP and CA filters are discussed in detail.

Tar Removal

For a series of discontinuous and continuous smoking experiments with a final absolute filter, a tar balance over the three filter systems is shown in table 1. The values shown for each filter system are the average of five series of six smoked cigarettes (standard deviation <10%). Table 1 shows the tar content in milligram per cigarette, measured in three filter systems CA*, NP-15* and NP-30* after continuous and discontinuous (FTC directives) smoking.

TABLE 1

|  | Collected in mouth-piece | Collected in absolute filter | Total in mouthpiece + absolute filter | Remaining tar content after mouthpiece (%) |
| --- | --- | --- | --- | --- |
| CA continuous | 22 | 13 | 35 | 37 |
| NP-15 continuous | 28 + 4** | 5 | 37 | 14 |
| NP-30 continuous | 34 + 2** | 2 | 38 | 5 |
| CA discontinuous | 7 | 7 | 14 | 50 |
| NP-15 discontinuous | 8 + 2** | 3 | 13 | 23 |
| NP-30 discontinuous | 12 + 1** | 1 | 14 | 7 |

*CA: filter with 120 mg of cellulose acetate, NP-15: filter with 15 mg of network polymer plus 60 mg of cellulose acetate, NP-30: filter with 30 mg of network polymer plus 60 mg of cellulose acetate.
**Number on the left-hand side regards tar in 15 or 30 mg of NP, number on the right-hand side tar in 60 mg of CA.

Table 1 shows that the collecting of tar in the NP filters is better than in the CA filter. Continuous smoking increases the total tar content with respect to the Federal Trade Commission method by a factor of 2.5 to 3. Under both smoking conditions it holds good that the NP filters with an increasing NP content work considerably better than the standard CA filter.

Figure 10:
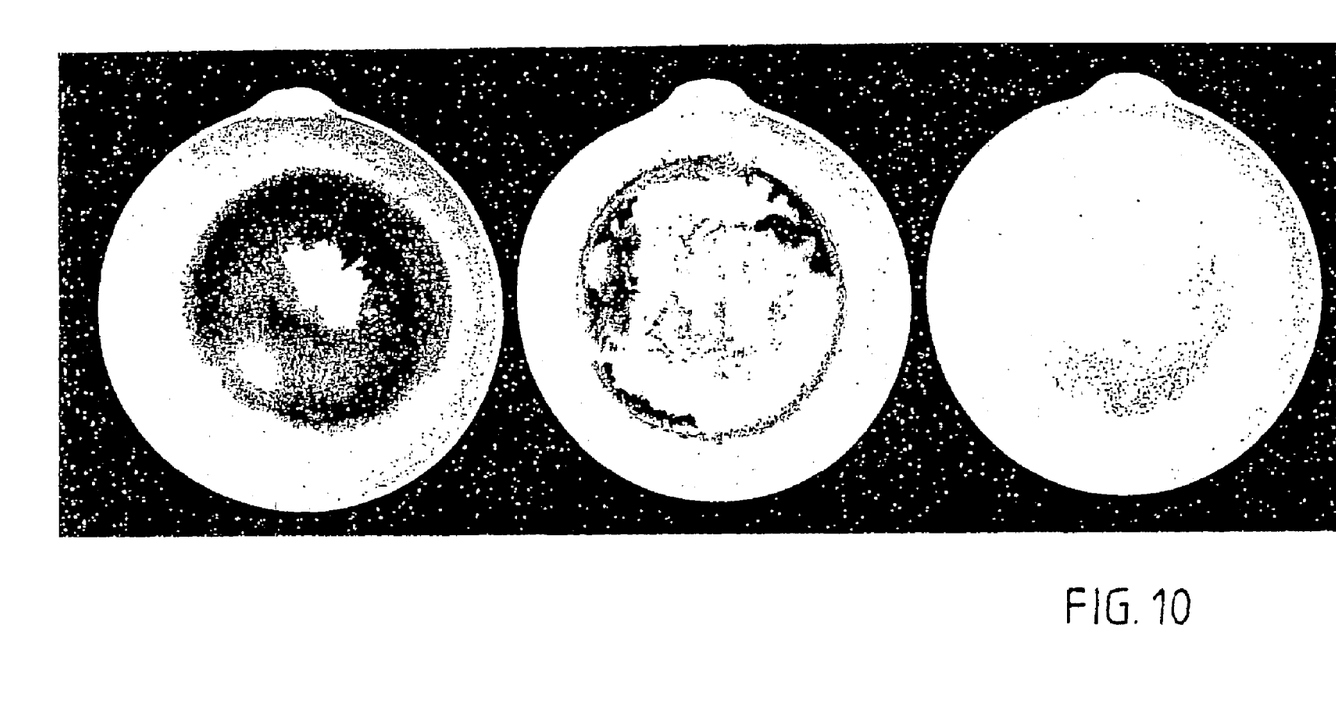
FIG. 10 shows the results with regard to the removal of tar by a cellulose acetate filter and by filters comprising the foam according to the invention.

As a result the exposure of the smoker to tar is lower. The trays with evaporated CA, NP-15 and NP-30 filtrate obtained with the FTC method, shown in FIG. 10, show this qualitatively well. FIG. 10 shows a qualitative picture of exposure of the smoker to tar in the form of evaporated extract originating from the absolute filter (after passing the mouthpiece). It regards a series of three collection samples of six filter cigarettes smoked according to the FTC method. From left to right: CA control, NP-15 and NP-30.

The quantity of tar that passes through the filter during smoking according to the standard FTC directive can also be compared to the quantity of tar that passes through with the double and quadruple frequency, respectively, of inhalations according to said directive (see table 2). The average incineration periods here decrease from 6 to 5.5 and 4.5 minutes, respectively. In all cases a length of the remaining tobacco column of 3–5 mm above the filter could be maintained.

The values shown for each filter system are the average of three series of six smoked cigarettes (standard deviation <8%). In table 2 the tar content is shown in milligram per cigarette for two filter systems CA* and NP-15* for discontinuous smoking according to the one inhalation per minute FTC directive, compared to the double and quadruple frequency of said directive.

TABLE 2

|  | Collected in mouthpiece | Collected in absolute filter | Total in mouthpiece + absolute filter | Remaining tar content after mouthpiece (%) |
| --- | --- | --- | --- | --- |
| CA-FTC | 7 | 7 | 14 | 50 |
| CA-FTCx2 | 7 | 10 | 17 | 59 |
| CA-FTCx4 | 17 | 21 | 38 | 55 |
| NP-15-FTC | 8 + 2** | 3 | 13 | 23 |
| NP-15-FTCx2 | 13 + 2** | 4 | 19 | 21 |
| NP-15-FTCx4 | 29 + 2** | 4 | 35 | 11 |

*CA: filter with 120 mg of cellulose acetate, NP-15: filter with 15 mg of network polymer plus 60 mg of cellulose acetate.
**Number on the left-hand side regards tar in 15 mg of NP, number on the right-hand side tar in 60 mg of CA.

With an increased inhalation frequency (FTCx4) the effectivity of the network polymer filter increases by a factor of 5. Moreover, the 21 milligram of tar per cigarette passed through a CA filter is three quarters higher than the 12 milligram that is specified on the packaging.

As a result of the occurring pressure changes when increasing the inhalation frequency to two and four inhalations per minute, the tar content in the smoke after the CA filter increases (see table 2).

The NP filter appears to be better resistant to the often occurring pressure changes than the CA filter. The quantity of tar in the smoke after the NP filter is independent of the inhalation frequency.

Pressure Drop Over the Filter

To the user it is important to know whether a filter with an improved tar removal does not involve too high a pressure drop. The pressure drop measured over the filter for three filter systems in discontinuous smoking for the three filters CA, NP-15 and NP-30, is 70 mbar, 70 mbar and 90 mbar, respectively. These values are the average of two series of six smoked cigarettes (standard deviation <12%).

Under continuous smoking conditions the average pressure drops are considerably lower. For the CA and the NP-15 filter an average of 6 mbar was found; the pressure drop over the NP-30 filter was 9 mbar.

Incineration Ash of the Particles in the Smoke After Passing the Cigarette Filter The incineration ash of the organic and inorganic particles present in tobacco smoke after passing the filter was measured in discontinuous smoking. For the three filter systems CA, NP-15 and NP-30 the incineration ashes after passing the filter are 15, 4 and 1 mg/cigarette, respectively. The values shown for each filter system are the average of two series of six smoked cigarettes (standard deviation <12%).

Comparison to the values in table 1 shows that the incineration ash passing the mouthpiece of the CA control is twice as great as the tar content (7 mg/cigarette).

In addition to what has already been established for tar reduction, the efficiency in collecting the incineration ashes (particles) for NP filters is considerably better than the CA control.

Removal of PAHs

The removal of polycyclic aromatic hydrocarbons from tobacco smoke by means of the network polymer filter was examined under continuous smoking conditions. The values shown for each filter system are the average of three cigarettes. Table 3 shows the total of 16 EPA-PAHs (total-PAHs) and the sum of 6 carcinogens (c-PAHs) in microgram. (µg) per cigarette, sampled in tobacco smoke under continuous smoking conditions after passing through CA*, NP-15* and NP-30*.

TABLE 3

| | PAHs bound to particles in tobacco smoke | PAHs molecularly present in tobacco smoke | Total PAHs present in tobacco smoke |
|---|---|---|---|
| Total-PAHs | | | |
| CA | 16.0 | 0.9 | 16.9 |
| NP-15 | 4.9 | 1.0 | 5.9 |
| NP-30 | 0.2 | 0.9 | 1.1 |
| c-PAHs | | | |
| CA | 2.1 | <0.05 | 2.1 |
| NP-15 | 0.8 | <0.05 | 0.8 |
| NP-30 | <0.05 | <0.05 | <0.05 |

*CA: filter with 120 mg of cellulose acetate, NP-15: filter with 15 mg of network polymer plus 60 mg of cellulose acetate, NP-30: filter with 30 mg of network polymer plus 60 mg of cellulose acetate.

The total-PAHs have been calculated by the summation of the 16 EPA-PAHs. Of 6 of these PAHs the carcinogenicity is known among which the two most carcinogenic PAHs occurring in tobacco smoke, namely benzo(a)pyrene and dibenzo(ah)anthracene (Hoffmann, 1997). The c-PAHs are the sum of said 6 PAHs.

Table 3 shows that PAHs in tobacco smoke of the CA filter have a substantially (94%) particle-bound character. Such a distribution of non-volatile PAHs in the particle phase and molecularly present in the gaseous phase of tobacco smoke corresponds to what is mentioned about that in the literature (Liang and Pankow, 1996).

Of the total-PAHs in the control two-thirds are fluoranthene and pyrene, present in the particle phase with 6.8 and 4.6 µg per cigarette, respectively. Naphthalene, total of 0.6 µg per cigarette, is the most volatile compound in the series of measured total-PAHs (see table 3) and is for 80% molecularly present in the gaseous phase.

Said three polycyclic aromatic hydrocarbons, as regard both mass concentration and mutual proportion, are considered characteristic to tobacco smoke (Baker, 1999).

Benzo(a)pyrene and dibenzo(ah)anthracene are quantitatively the most important as carcinogenic PAHs in tobacco smoke (Hoffmann, 1997). Both compounds are dominantly present in the particle phase of the tobacco smoke examined, with a total quantity of 0.4 and 1.6 microgram per cigarette, respectively. When using the NP-30 filter an extensive reduction (93%) of the content of total-PAHs occurs.

For the NP-15 filter the reduction of total-PAHs is 65%.

Said results correspond well to the values for tar removal, found under continuous smoking conditions (see table 1).

The tar reduction for the NP-30 and NP-15 filters are 95 and 86%, respectively.

Based on weight, the quantity of PAHs is in the microgram range, as such it is approximately 0.1% of the tar mass formed (in milligram) per cigarette.

Comparison one to the other of the values shown in table 3 makes it clear that for the tested filter systems the concentration of volatile total-PAHs in the gaseous phase (after passing the filter) remains the same. Adsorption of volatile PAHs from the gaseous phase of tobacco smoke to the surface of the network polymer does not occur or hardly so.

Removal of Nicotine

The adsorption of nicotine to network polymer was examined in a discontinuous smoking experiment. Table 4 shows nicotine measurements that have been made to NP-15 and NP-30 filters. The values shown for each filter system are the average of four cigarettes smoked according to the FTC method. In table 4 nicotine (µg/cigarette), bound to particles in tobacco smoke and molecularly present after passing through three different filter systems (CA*, NP-15* and NP-30*), respectively, is shown.

TABLE 4

| | Nicotine bound to particles in tobacco smoke | Nicotine molecularly present in tobacco smoke | Total nicotine present in tobacco smoke |
|---|---|---|---|
| CA control | 818 | 3 | 821 |
| NP-15 | 129 | 4 | 133 |
| NP-30 | 29 | 3 | 32 |

*CA: filter with 120 mg of cellulose acetate, NP-15: filter with 15 mg of network polymer plus 60 mg of cellulose acetate, NP-30: filter with 30 mg of network polymer plus 60 mg of cellulose acetate.

Because of the good separation of particles, network polymer unintendedly also functions effectively as filter material for nicotine in tobacco smoke. The nicotine concentrations in the particle phase of the tobacco smoke shown in table 4 strongly drop in case of increasing NP filter mass. The quantity of molecularly present nicotine may be low but is constant. The adsorption of molecularly present nicotine to the surface of the network polymer, analogous to the PAHs, does not play a part or hardly so.

General Toxicity of Cigarette Smoke After Passing the Filter

Tar in cigarette smoke is a complex matrix of compounds of which the acute effects to the health of the individual smoker are not easy to determine. To obtain an indication of the general toxicity of tar originating from smoking experiments via a quick method, the *V. fischeri* assay was used.

To that end the inhibition of the light output of tobacco smoke passing a filter with network polymer and cellulose acetate, respectively, was expressed with regard to the light output when exposed to a blank of air (see table 5). The values shown for each filter system are the average of two series of six smoked cigarettes. Table 5 shows the general toxicity, determined with the *V. fischeri* assay and the DR-CALUX assay for three filter systems (CA*, NP-15* and NP-30*) in discontinuous smoking.

TABLE 5

|  | Procedure blank | CA control | NP-15 | NP-30 |
|---|---|---|---|---|
| General toxicity (%)** | 0 | 91 | 28 | 5 |
| CALUX-TEQ (nmol/ml) | 1.4 | 468 | 133 | 8.2 |

*CA: filter with 120 mg of cellulose acetate, NP-15: filter with 15 mg of network polymer plus 60 mg of cellulose acetate, NP-30: filter with 30 mg of network polymer plus 60 mg of cellulose acetate.
**General toxicity as percentage activity inhibition in bioassay blank.

The general toxicity in table 5 strongly decreases as the mass of NP in the NP filter increases. Said data, due to the experimental arrangement chosen, only regard the solid particles in tobacco smoke that were collected after passing the filter.

The contribution of compounds in the gaseous phase is not considered here, but it is very likely negligible. In table 5 the CALUX-TEQ values of the incineration gases that have passed the various filters, are also shown. In the DR-CALUX assay the conditions are adapted to the primary measurement of the effects of PAHs and not of dioxin-like compounds. It can be seen here that the quantity of PAH-specific toxicity dramatically drops when the quantity of NP in the filter material increases.

The contribution of network polymer itself to the general and specific toxicity appears to be negligible in these experiments. Extraction of the unloaded NP-30 filter (without 60 mg of CA) results in a value of 0.6 nmol TEQ per ml of extract; a multiple lower than the blank of the entire procedure without smoking in table 5.

General Toxicity of Incineration Gases of Filter Material Itself

The progressing incineration zone in the cigarette will at a certain moment be able to let the temperature rise to a value critical to decomposition of the filter. To obtain a qualitative impression of this, the gases formed in the incineration of the filters were absorbed in demineralised water or in acetone.

Blank is the absorption liquid after passing ambient air. The values shown in table 6 for each filter system are the average of two series of six incinerated filters. In this test the general toxicity of 120 mg of cellulose acetate from a standard filter was compared to 30 mg of network polymer, in this case without 60 mg of CA.

The incineration process of both materials was without flash point, contrary to the NP filter the CA filter did not extinguish spontaneously. In table 6 the toxicity is shown of manually incinerated cigarette filters (CA control and NP-30) that were not exposed to tobacco smoke.

TABLE 6

|  | Blank | CA control | 30 mg NP |
|---|---|---|---|
| General toxicity (Demiwater-absorption)* | 16 | 46 | 40 |
| General toxicity (Acetone-absorption)* | 7 | 37 | 30 |
| CALUX-TEQ (%)** | 0.54 | 100 | 9.5 |

*General toxicity as percentage inhibition in bioassay blank (*V. fischeri* in 2% NaCl).
**CALUX-TEQ percentage of CA control has been set at 100%.

The use of the absorption media acetone and demiwater shows no difference with regard to the incineration gases formed out of the filter materials. From the data in table 6 it appears that 30 mg of network polymer is not more harmful than 120 mg of cellulose acetate used in the CA control. In the DR-CALUX assay the incinerated CA control filter in both series showed 10 times more signal than the incinerated NP filter. This means that the NP filter during incineration results in less PAH specific toxicity. This holds also for both NP-15 and NP-30 filters, each containing 60 mg CA in addition to 15 and 30 mg NP, respectively.

REFERENCE LIST

Baker R. R. (1999) Smoke chemistry. In: Tobacco, production, chemistry and technology, pages 398–440 (Davis D. L. and Nielsen D. L., red.) Blackwell Science Limited, Oxford, England.

Bradford J. A., Harlan W. R. and Hanmar H. R. (1936) Nature of cigarette smoke: technic of experimental smoking. Industrial and Engineering Chemistry 28: 836–839.

Chuang J. C., Kuhiman, M. R. and Wilson, N. K. (1990) Evaluation of methods for simultaneous collection and determination of nicotine and polynuclear aromatic hydrocarbons in indoor air. Environmental Science and Technology 24: 661–665.

Djordjevic M. V., Hoffmann D. and Hoffmann I. (1997) Nicotine regulates smoking patterns. Preventive Medicine 26: 435–440.

Hamers T., Smit M. G. D., Murk A. J. and Koeman J. H. (2000) Biological and chemical analysis of the toxic potency of pesticides in rainwater. Presented to Chemosphere.

Hoffmann D. and Hoffmann I. (1997) The changing cigarette 1950-1995. Journal of Toxicology and Environmental Health 50: 307–364.

Liang C. and Pankow J. F. (1996) Gas/particle partitioning of organic compounds to environmental smoke: partition coefficient measurements by desorption and comparison to urban particulate material. Environmental Science and Technology 30: 2800–2805.

Murk A. J., Leonards P. E. G., Van Hattum B., Luit R., Van der Weiden M. E. J. and Smit M. (1998) Application of biomarkers for exposure and effects of polyhalogenated aromatic hydrocarbons in naturally exposed European otters (*Lutra lutra*). Environmental Toxicology and Pharmacology 6: 91–102.

Pillsbury H. C., Bright C. C., O'Connor K. J. and Irish F. W. (1969) Tar and nicotine in cigarette smoke. Journal of the Association of Official Analytical Chemists 552: 458–462.

The invention claimed is:

1. In a cigarette filter for the purification of air, the filter comprising a filter material, the improvements wherein:
the filter material comprises a powder;
the powder comprises particles of foam having cavities and interstitial spaces situated outside of the cavities, the cavities being defined by walls, the walls of the cavities being composed of a crosslinked polymer and possible additives, the average largest dimension of the cavities being in the range of 30–350 μm, a considerable part of the cavities comprising two or more perforations in their walls, the perforations having an average diameter in the range of 5–300 μm, a considerable part of the perforations of adjacent cavities being positioned with respect to each other such that a continuous, non-linear path is formed, the foam having a porosity of at least 45 vol. % the porosity being defined as the volume percentage, based on the total volume of the foam, of that part of the foam accessible to matter passing through the foam, and the foam having a specific surface in the range of 0.1–15 m$^2$/g, and the crosslinked polymer is a urea formaldehyde-based copolymer.

2. A filter according to claim 1, in which the average largest dimension of the cavities is in the range of 50–250 μm.

3. A filter according to claim 1, in which more than 90% of the cavities comprise two or more perforations in their walls.

4. A filter according to claim 1, in which the perforations have an average diameter in the range of 5–200 μm.

5. A filter according to claim 4, in which the peribrations have an average diameter in the range of 10–100 μm.

6. A filter according to claim 1, in which more than 40% of the perforations of adjacent cavities are positioned with respect to each other such that a continuous, non-linear path is formed.

7. A filter according to claim 1, in which the foam has a porosity of at least 60 vol. %.

8. A filter according to claim 7, in which the foam has a porosity in the range of 80–99 vol. %.

9. A filter according to claim 1, in which the foam has a specific surface in the range of 3–15 m$^2$/g.

10. A filter according to claim 1, in which the possible additives are selected from the group consisting of surfactants, fillers and pigments.

11. A filter according to claim 1, in which the specific mass of the foam in dry condition is in the range of 5–100 kg/m$^3$.

12. A filter according to claim 11, in which the specific mass of the foam in dry condition, is in the range of 10–50 kg/m$^3$.

13. A falter according to claim 1 wherein the filter material also comprises cellulose acetate.

14. A filter according to claim 1, wherein the particles have a size of 0.1 to 2 mm.

15. A cigarette comprising a mouthpiece end a tobacco column, in which the mouthpiece is filled with a filter as defined in claim 1.

16. In a cigarette filter structure for the purification of air, the improvements comprising a filter material comprising a powder comprising particles of foam comprising urea form-aldehyde-based copolymer obtained by a method comprising:

mixing air and a foaming agent solution under pressure in a mixing part of an injection device, the mixing part being filled with a plurality of inert mixing bodies having dimensions in the range of 2 to 15 mm, so tat a non-cured foam is formed, supplying under pressure the non-cured foam from to mixing part and a prepolymer solution to a reaction part of the injection device so that a curable foam is formed, discharging the foam from the injection device and drying it to the air, so that a cured foam is formed.

17. A filter according to claim 16, in which the plurality of inert mixing bodies is a plurality of glass beads having a diameter in the range of 4 to 10 mm.

18. A filter according to claim 17, in which the diameter of the glass beads is 7 mm.

19. A filter according to claim 16, in which the foaming agent solution is an aqueous solution comprising phosphoric acid and resorcinol and the prepolymer solution is an aqueous solution comprising a urea formaldehyde pre-condensate and optionally an additional amount of urea.

20. A filter according to claim 16, in which the foaming agent solution and the prepolymer solution are supplied to the injection device at an equal throughput speed in volume units per time unit.

21. A filter according to claim 16, in which the foaming agent solution and the prepolymer solution are supplied to the injection device under a pressure of 11.5 bar and at a throughput speed of 10 litre/minute and the air is supplied to the injection device under a pressure of 5.5 bar.

22. A filter according to claim 16, in which the filter material also comprises cellulose acetate.

23. A filter according to claim 16,wherein the particles have a size of 0.1 to 2 mm.

24. A cigarette comprising a mouthpiece and a tobacco column, in which the mouthpiece is filled with a filter material as defined in claim 16.

25. In a process for manufacturing a cigarette filter for the purification of air, the improvements comprising providing a powder comprising particles of foam comprising cavities and interstitial spaces situated outside of the cavities, the cavities being defined by walls, the walls of the cavities being composed of a crosslinked urea formaldehyde-based copolymer and possible additives, the average largest dimension of the cavities being in the range of 30–350 μm, a considerable part of the cavities comprising two or more perforations in their walls, the perforations having an average diameter in the range of 5–300 μm, a considerable part of the perforations of adjacent cavities being positioned with respect to each other such that a continuous, non-liner path is formed, the foam having a porosity of at least 45 vol. % the porosity being defined as the volume percentage, based on the total volume of the foam, of that part of the foam accessible to matter passing through the foam, and the foam having a specific surface in to range of 0.1–15 m$^2$/g.

26. A process according to claim 25, wherein the particles have a size of 0.1 to 2 mm.

* * * * *